United States Patent [19]
Habermeier

[11] 3,816,923
[45] June 18, 1974

[54] MEASURING APPARATUS

[75] Inventor: Hans K. Habermeier, Florence, S.C.

[73] Assignee: Pee Dee Pathology Associates, Florence, S.C.

[22] Filed: Apr. 12, 1973

[21] Appl. No.: 350,505

[52] U.S. Cl. ............................. 33/1 BB, 33/168 B
[51] Int. Cl. ..................... G01b 11/08, C12k 01/00
[58] Field of Search .... 33/174 R, 75 R, 76 R, 1 BB, 33/1 C, 168 R, 168 B, 181 A, 183, 184.5

[56] References Cited
UNITED STATES PATENTS

| | | | |
|---|---|---|---|
| 1,524,059 | 1/1925 | Scott | 33/174 G |
| 1,780,237 | 11/1930 | Leslie | 33/1 R |
| 2,237,378 | 4/1941 | Thienemann | 33/174 R |
| 2,524,790 | 10/1950 | Grunwald | 33/107 R |
| 3,693,261 | 10/1972 | Moore | 33/75 R |

*Primary Examiner*—Harry N. Haroian
*Assistant Examiner*—John W. Shepperd
*Attorney, Agent, or Firm*—Jones, Thomas & Askew

[57] ABSTRACT

Apparatus for the measurement of growth inhibition zones in microbial susceptibility tests including strips located radially of a dish containing a culture, each strip being locatable directly over an innoculum. The width of the strip is equal to the acceptable diameter of a growth inhibition zone, and the strip is transparent for ready, visual comparison of the width of the strip with the diameter of the growth inhibition zone. Two or more strips can be superposed to indicate intermediate acceptability standards.

10 Claims, 5 Drawing Figures

PATENTED JUN 18 1974  3,816,923
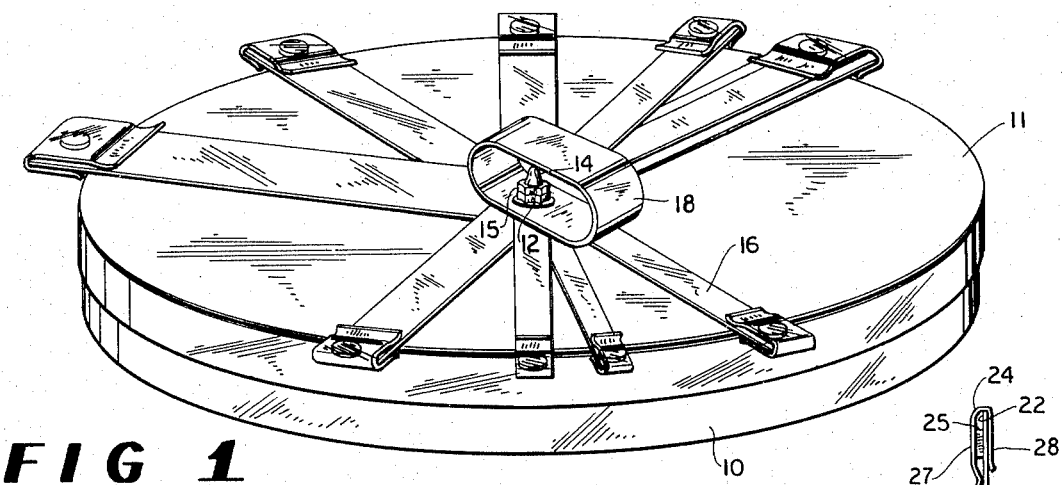
FIG 1
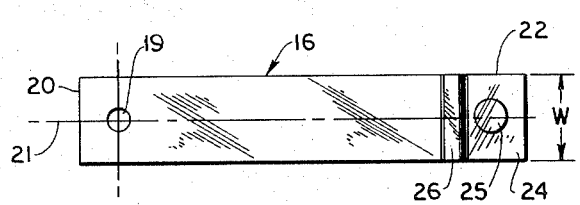
FIG 2
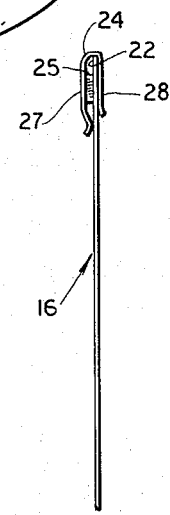
FIG 3
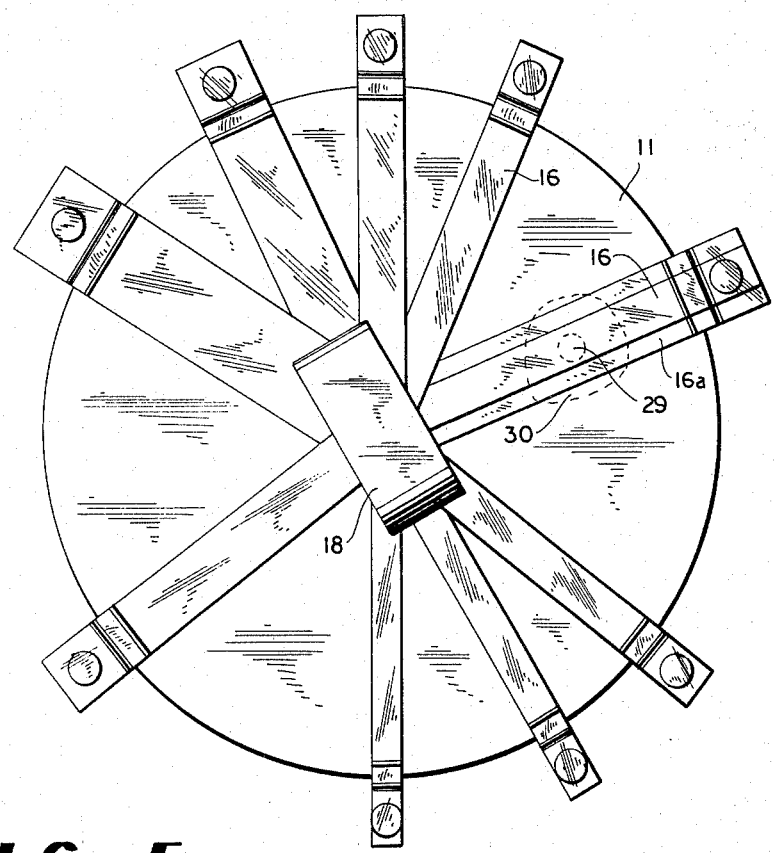
FIG 4
FIG 5

MEASURING APPARATUS

BACKGROUND OF THE INVENTION

This invention relates to apparatus for the determination of microbial susceptibility, and is more particularly concerned with apparatus that measures the diameters of growth inhibition zones in microbial growth studies.

A conventional technique to determine susceptibility of a microbial culture to a given antibiotic is to prepare a culture of standardized, uniform density on an agar plate. A standard disk of the particular antibiotic to be tested is then placed on the culture. The antibiotic, in accordance with its effectiveness to inhibit growth of a particular microbe, will cause a ring around the disk of antibiotics which is the growth inhibition zone. The growth inhibition zone is then measured, the diameter is compared to standard data, and the effectiveness of the antibiotic to inhibit growth of a particular microbe involved is thereby determined.

The technique is a rapid laboratory test that will give valid and reliable results when care is exercised in the performance of the test. Perhaps the greatest difficulty in the test is the rapid and accurate measurements of the diameter of growth inhibition zone. Since this diameter constitutes the final piece of information that is taken from the actual growth test, the accuracy of the final determination is entirely dependent on this one measurement.

Further, a technologist would generally prefer to test a plurality of different antibiotics on one agar plate. Since the plate must be made up with a standardized culture density, much time is saved by using the same prepared plate to test several antibiotics. The problem in conducting several tests on one plate is that the various antibiotics must be identified properly when the final measurements are made since different growth inhibition zone diameters are acceptable for different antibiotics. A failure in proper labeling would produce a complete failure in the results obtained.

In the past, the most common method of measuring the zone diameters has been simply to use a rule, or various forms of calipers, to measure the zone diameters. Since the zone to be measured is substantially two-dimensional, and can be easily destroyed by touching with instruments, it is quite difficult to obtain an accurate measurement with such apparatus. In addition, the zone is circular so that one must take the reading across the diameter to be assured of an accurate measurement, and there can be no indicia to point out the diameter. One must therefore simply take the largest observed measurement to be the diameter.

Proper labeling of the various antibiotics is usually largely on the basis of the technologist's memory, perhaps with some notes to assist the memory. Indications on the lid of the Petri dish have also been used; but, a slight misplacement of the innoculum, or of the lid, can lead to completely erroneous results.

SUMMARY OF THE INVENTION

The apparatus of the present invention overcomes the above-mentioned and other difficulties with the prior art by providing a plate for receipt of the microbial culture, and a lid to cover the plate. The lid is provided with a central fastening means to hold a plurality of strips radially of the lid. The strips are provided with locating means at one end to be received by the central fastening means so that the centerline of the strip will be along a radius of the plate, and the strip extends somewhat beyond the circumference of the lid, the extending end of the strip carrying appropriate labeling to identify the particular antibiotic or other innoculum. Each strip has a dimension that is substantially equal to the acceptable diameter of the growth inhibition ring, and the strips, as well as the lid, are transparent so that one can view the innoculum and the growth inhibition ring through the strip and through the lid to make a ready comparison of the growth inhibition ring with the strip dimension. The strips are movable circumferentially of the lid so that the strip can be precisely aligned with the growth inhibition ring; but, the strips are substantially fixed so that the label on the strip properly identifies the innoculum substantially beneath the strip. Though circular dishes are most common, it will be realized that the invention is readily adaptable to other shapes of dishes as long as the strip is locatable over the growth inhibition ring.

These and other features and advantages of the present invention will become apparent from consideration of the following specification when taken in conjunction with the accompanying drawings.

BRIEF DESCRIPTION OF THE DRAWINGS

FIG. 1 is a perspective view showing a dish having a lid thereon with the strips of the present invention distributed around the lid;

FIG. 2 is a top plan view of a strip made in accordance with the present invention with the labeling means on the end thereof;

FIG. 3 is a side elevational view of the single strip as shown in FIG. 2;

FIG. 4 is a side elevational view of two strips overlapped; and,

FIG. 5 is a top plan view of the device as shown in FIG. 1.

DESCRIPTION OF A PREFERRED EMBODIMENT

Referring now more particularly to the drawings, and to that embodiment of the invention here chosen by way of illustration, it will be seen in FIG. 1 that there is provided a substantially conventional Petri dish 10 having a lid 11 thereon. Centrally of the lid 11, there is a fastening means 12 here shown as comprising a screw 14 having a nut 15 threaded thereon. The various strips generally designated at 16 have holes at one end to be received over the screw 14 and held in place by the nut 12. There is also here shown a loop 18 that serves as a handle for conveniently carrying the device.

Looking at FIG. 2 of the drawings, it will be seen that each strip 16 has a hole 19 formed at its inner end 20. The hole 19 is located precisely along the centerline 21 of the strip 16, and is a predetermined distance from the inner end 20. This predetermined distance can conveniently be 10 mm, though it can vary for different sizes of the apparatus. It is contemplated that the hole 19 can be provided initially by perforating so that the disk can be punched out when the strip is to be used.

In the present embodiment of the invention, the width W of the strip 16 is equal to the standard against which the diameter of the growth inhibition ring is to be compared. The advantages of this feature will be more apparent later. On the outer end 22 of the strip 16, there is a clip 24 that carries the appropriate labeling means; and, this labeling means includes both the standard disk 25 to indicate the antibiotic being tested, and a written label 26 to show the name of the antibiotic.

As is more clearly shown in FIG. 3 of the drawings, it will be seen that the clip 24 is substantially U-shaped and is formed with enough space between the upper and lower legs 27 and 28 respectively to receive the disk 25 therebetween and hold the disk 25 to the strip 16. The extending end of the upper leg 27 is bent downwardly to clamp against the body of the strip 16, and it is on this extending end that the appropriate labeling can be provided. As is shown in FIG. 4 of the drawing, the clip 24 can also be used to hold two or more strips 16 together as will be discussed more fully hereinafter.

Attention is now directed to FIG. 5 of the drawings where it will be seen that there is a plurality of strips 16. Each strip is placed along a radius of the lid 11, and the strips are spaced circumferentially around the lid. The strip 16a shown in FIG. 5 includes two of the strips 16 overlapped and clipped together with the clip 24 as is shown in FIG. 4 of the drawings. Beneath the strip 16a, it will be seen that there is an antibiotic disk 29 with the growth inhibition ring 30 indicated in broken lines. Since the lid 11 is transparent, and both the strips 16 are transparent, one can readily look through the strips 16a and the lid 11 to see the antibiotic disk 29 and its growth inhibition ring 30. A direct comparison is now made by comparing the diameter of the growth inhibition ring 30 with the width of the strip 16a. The narrower strip would have a width that corresponds to, perhaps, the minimum acceptable growth inhibition ring diameter, and the wider of the two strips 16a would, perhaps, have a width that corresponds to the preferred growth inhibition ring diameter. Thus, the width W of the strips 16 includes the standard against which the growth inhibition ring diameter is to be compared so that a direct reading is obtained.

From the foregoing, it should now be apparent that one can prepare the microbial culture within the dish 10 as is well known in the art, and a plurality of antibiotic doses would be placed on the culture and spaced circumferentially around the dish 10. One of the strips 16 would be prepared for each of the antibiotic doses, the identifying disk 25 would be placed on the end of the strip and held thereto by means of a clip 24, and the clip 24 would be appropriately labeled as at 26 to identify the particular antibiotic. When the transparent lid 11 is placed on the dish 10, each strip 16 would be located substantially over the disk 29 that is indicated by the indicia on the strip 16. The nut 15 would be tightened to hold the various strips 16 in the appropriate location so that there would be no confusion as to which disk 25 corresponds to which antibiotic dose.

The apparatus would next be set aside until the appropriate length of time at which the results of the test are to be determined. When the results are to be determined, the technologist would observe the antibiotic disk 29 and its corresponding growth inhibition rings 30 directly through the transparent strip 16 and the transparent lid 11. By so doing, there is a ready comparison of the diameter of the growth inhibition ring 30 and the width of the strip 16; and, since the width W of the strip 16 has been predetermined as the desired diameter of the growth inhibition ring 30, the effectiveness of the particular antibiotic to inhibit the growth of the particular microbe can be immediately determined with a high degree of accuracy. When there are maximum and minimum standards, or intermediate acceptable standards, two or more strips 16 can be overlapped as shown at strip 16a so that there will be an immediate determination of the range into which the diameter of the growth inhibition ring falls.

As here indicated, each of the strips 16 is of uniform width throughout its length. By this means, the antibiotic disk 29 can be placed virtually anywhere within the dish 10, and the ready comparison with the width of the strip 16 is available.

When the results are to be read, in the event that one of the strips 16 is somewhat off-center from the disk 29 and its growth inhibition ring 30, the nut 12 can be slightly loosened so that the strip can be moved very slightly circumferentially for precise alignment of the strip 16 with the growth inhibition ring 30; nevertheless, the strips 16 will be sufficiently well held so that there will be no confusion as to the appropriate labeling on each of the antibiotic disks 29.

It will be obvious to those skilled in the art that the particular embodiment of the invention here chosen is by way of illustration only, and is meant to be in no way restrictive; therefore, numerous changes and modifications may be made, and the full use of equivalents resorted to, without departing from the scope of the invention as defined by the appended claims.

I claim:

1. Apparatus for comparing test data with standard data wherein the test data includes a measurable dimension and the standard data is expressible in terms of an acceptable dimension, the apparatus including a dish for containing the test data, a cover receivable on the said dish, fastening means on the said cover, at least one strip, said strip being movably held by the said fastening means and locatable over the test data, said strip having a dimension equal to the acceptable dimension, said strip and said cover being transparent for visual comparison of the said dimension of the strip with the measurable dimension of the test data.

2. Apparatus according to claim 1, and including a clip, said clip being receivable over one end of the said strip, said clip carrying identifying indicia.

3. Apparatus according to claim 2, said at least one strip comprising two strips superposed one over the other, said clip holding said two strips in superposed position.

4. Apparatus according to claim 1, said dish being circular in plan view, said at least one strip being a plurality of strips, said fastening means being located centrally of said cover, each of said strips having an extending end located beyond the circumference of said dish, a plurality of clips, each of said clips being received on said extending end of said each of said strips, each of said clips carrying identifying indicia.

5. Apparatus according to claim 4, each of said plurality of strips being movable circumferentially of said dish and substantially fixable with respect to said dish.

6. Apparatus according to claim 1, said dish and said cover being circular in plan view, said at least one strip being a plurality of strips, each of said plurality of strips being movable circumferentially of said dish, said dish being adaptable to receive a plurality of separate test data, each of said strips being locatable above one of the said plurality of separate test data, each of said strips having a uniform width, the said dimension equal to the acceptable dimension being the said width.

7. Apparatus according to claim 6, said fastening means being located centrally of said cover and including a screw passing through said cover, a nut threadedly engageable with said screw, said plurality of strips being receivable over said screw and held by said nut.

8. Measuring apparatus for measuring geometric shapes within a dish, said measuring apparatus comprising a transparent lid for placement over a dish, at least one strip, and fastening means for holding said strip on said lid above the geometric shape in the dish, said strip being transparent for allowing visual inspection of the geometric shape in the dish through said strip and said lid.

9. Measuring apparatus according to claim 8, said at least one strip comprising a plurality of strips, each of said plurality of strips being arranged to measure a different geometric shape within the dish, and labeling means carried by each of said plurality of strips.

10. The apparatus according to claim 8 and wherein said fastening means is constructed and arranged with respect to said at least one strip and said lid to pivotally mount said at least one strip at one of its ends on said lid.

* * * * *